US010819456B2

(12) United States Patent
Spreemann

(10) Patent No.: US 10,819,456 B2
(45) Date of Patent: Oct. 27, 2020

(54) DISTRIBUTION POINT UNIT TO EXCHANGE COMMUNICATION DATA BETWEEN A SERVICE PROVIDER AND SUBSCRIBERS

(71) Applicant: Corning Optical Communications LLC, Hickory, NC (US)

(72) Inventor: Martin Spreemann, Berlin (DE)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/283,280

(22) Filed: Feb. 22, 2019

(65) Prior Publication Data

US 2019/0190632 A1 Jun. 20, 2019

Related U.S. Application Data

(63) Continuation of application No. PCT/US2017/048802, filed on Aug. 28, 2017.

(30) Foreign Application Priority Data

Aug. 31, 2016 (EP) .................................... 16188623

(51) Int. Cl.
*H04B 10/60* (2013.01)
*H04H 20/84* (2008.01)
(Continued)

(52) U.S. Cl.
CPC ............ *H04H 20/84* (2013.01); *H04H 20/69* (2013.01); *H04L 12/10* (2013.01);
(Continued)

(58) Field of Classification Search
CPC .... H04H 20/84; H04H 20/69; H04L 12/2856; H04L 12/4625; H04L 12/10; H04L 41/04;
(Continued)

(56) References Cited

U.S. PATENT DOCUMENTS 5,301,057 A 4/1994 Eames
7,561,801 B2 7/2009 Miller et al.
(Continued)

OTHER PUBLICATIONS

Feldman, "Reverse Powering, Its Benefits and Constraints" MICROSEMI. 2014. <http://www.microsemi.com/document-portal/doc_view/134499-reverse-power-feed-rpf-benefits-and-constraints.
(Continued)

*Primary Examiner* — Dibson J Sanchez
(74) *Attorney, Agent, or Firm* — Tamika A. Crawl-Bey

(57) ABSTRACT

A distribution point unit to exchange communication data between a service provider and subscribers. The distribution point unit may include a first port to couple the distribution point unit to an optical data network to exchange communication data between the distribution point unit and the service provider, and a second port to couple the distribution point unit to an electrical data network to exchange the communication data between the subscribers and the distribution point unit. The distribution point unit may also include a third port to couple the distribution point unit to an electrical device, the third port being configured to provide control data to control the electrical device.

11 Claims, 5 Drawing Sheets

(51) Int. Cl.

*H04L 12/28* (2006.01)
*H04L 12/46* (2006.01)
*H04H 20/69* (2008.01)
*H04L 12/10* (2006.01)
*H04L 12/24* (2006.01)
*H04Q 11/00* (2006.01)
*H04J 14/02* (2006.01)
*H04J 14/08* (2006.01)
*H04B 10/69* (2013.01)

(52) U.S. Cl.

CPC ...... *H04L 12/2856* (2013.01); *H04L 12/4625* (2013.01); *H04L 41/04* (2013.01); *H04B 10/60* (2013.01); *H04B 10/69* (2013.01); *H04J 14/0254* (2013.01); *H04J 14/086* (2013.01); *H04Q 2011/0064* (2013.01)

(58) Field of Classification Search

CPC ......... H04L 67/12; H04B 10/60; H04B 10/69; H04J 14/0254; H04J 14/086; H04Q 2011/0064

USPC .................................... 398/43–103, 202–214

See application file for complete search history.

(56) References Cited

U.S. PATENT DOCUMENTS 7,672,591 B2 3/2010 Soto et al.
7,701,092 B1 * 4/2010 Parker .................... H04L 12/10 307/154
7,953,325 B2 5/2011 Farmer et al.
8,180,225 B2 * 5/2012 Werthen ............... H04B 10/807 398/135
8,601,289 B1 12/2013 Smith et al.
8,615,168 B2 12/2013 Anschutz
8,868,946 B2 * 10/2014 Buhari .................... G06F 1/266 713/320
8,914,651 B2 12/2014 Rembert et al.
8,982,726 B2 3/2015 Davari
9,025,621 B2 5/2015 Finkelstein
9,787,400 B2 10/2017 Bourg et al.
10,419,130 B2 * 9/2019 Soto .................... H04L 12/2898
2004/0208537 A1 * 10/2004 Lee .................... H04J 14/0238 14/238
2005/0111533 A1 * 5/2005 Berkman ............... H04B 3/542 375/220
2006/0063509 A1 * 3/2006 Pincu ...................... G06F 1/266 455/402
2006/0117089 A1 * 6/2006 Karam ...................... H04L 1/22 709/208
2006/0133368 A1 * 6/2006 Tolliver .................. G06F 1/266 370/389
2006/0143583 A1 * 6/2006 Diab ....................... G06F 1/189 713/300
2007/0041387 A1 * 2/2007 Ghoshal .................. H04L 12/10 370/395.52
2007/0058666 A1 * 3/2007 Pratt ................... H04L 12/4625 370/463
2007/0147835 A1 * 6/2007 Kim .................... H04J 14/0246 14/246
2007/0211763 A1 * 9/2007 Solomon ................. H04L 12/18 370/498
2007/0260904 A1 * 11/2007 Camagna ................ H04L 12/10 713/310
2008/0159744 A1 * 7/2008 Soto ..................... H04B 10/808 398/115
2008/0168283 A1 * 7/2008 Penning .................. G06F 1/263 713/310
2008/0267626 A1 * 10/2008 Niu ...................... H04L 63/104 398/66
2009/0055662 A1 * 2/2009 Diab ......................... G06F 1/26 713/300
2009/0060531 A1 * 3/2009 Biegert ............... H04J 14/0252 14/252
2009/0073957 A1 * 3/2009 Newland ................ G06F 1/263 370/352
2009/0135970 A1 5/2009 Miyagi et al.
2009/0154920 A1 * 6/2009 Yang .................. H04L 12/2861 398/17
2009/0228722 A1 * 9/2009 Lin ........................ H04L 12/10 713/300
2009/0276515 A1 * 11/2009 Thomas .................. H04L 67/12 709/223
2010/0007334 A1 * 1/2010 Apfel ...................... H04L 12/10 324/123 R
2010/0217965 A1 * 8/2010 Wolff ...................... H04L 12/10 713/2
2010/0218003 A1 * 8/2010 Blaha ...................... H04L 12/10 713/300
2011/0103382 A1 * 5/2011 Kim .................... H04L 12/2874 370/390
2011/0206063 A1 * 8/2011 Diab .................... H04L 12/413 370/466
2011/0217873 A1 * 9/2011 Diab ...................... H01R 13/66 439/620.01
2013/0011142 A1 * 1/2013 Goodson ........... H04Q 11/0067 398/98
2013/0022132 A1 * 1/2013 Paulsen .................... H04B 3/54 375/257
2013/0028605 A1 * 1/2013 Beach ................ H04Q 11/0067 398/79
2013/0312048 A1 * 11/2013 Grossman ........... H04N 21/654 725/109
2014/0016527 A1 * 1/2014 Coffey ................. H04B 5/0062 370/310
2014/0037077 A1 * 2/2014 Marchetti ................ H04B 3/56 379/93.06
2014/0129853 A1 * 5/2014 Diab ..................... H04L 12/413 713/310
2014/0355986 A1 * 12/2014 Trojer .................... H04Q 11/00 398/49
2015/0043913 A1 2/2015 Xu et al.
2015/0078756 A1 3/2015 Soto et al.
2016/0066073 A1 * 3/2016 Eddleston .......... H04Q 11/0067 398/25
2016/0277112 A1 * 9/2016 Dai ...................... H04B 10/272
2018/0063928 A1 * 3/2018 Hick ...................... H05B 47/18
2018/0191158 A1 * 7/2018 Chappell ................. H04L 12/10
2019/0280895 A1 * 9/2019 Mather ................... H04L 12/10
2019/0297710 A1 * 9/2019 Crenshaw ........... H04L 12/2881

OTHER PUBLICATIONS

International Search Report and Written Opinion of the International Searching Authority; PCT/US2017/048802: dated Nov. 6, 2017; 10 Pages; ISA/US Commissioner for Patents.

* cited by examiner

DISTRIBUTION POINT UNIT TO EXCHANGE COMMUNICATION DATA BETWEEN A SERVICE PROVIDER AND SUBSCRIBERS

CROSS REFERENCE TO RELATED APPLICATIONS

This application claims the benefit of priority of European Patent Application 16186623.1, filed Aug. 31, 2016, and International Application No. PCT/US2017/048802, filed Aug. 28, 2017. The content of each aforementioned application is relied upon and incorporated herein by reference in its entirety.

TECHNICAL FIELD

Aspects of the present disclosure relate generally to distribution point units that are used to exchange communication data between a service provider and subscribers. The service provider is coupled to the distribution point unit by an optical data network and the subscribers are connected to the distribution point unit by an electrical data network.

BACKGROUND

Optical access networks connect subscribers of high bandwidth telecommunication services to their service providers. Because of its high dependency on building access and infrastructure, the best performing, all optical, Fiber-To-The-Home (FTTH) model has problems to be accepted by the market. Moreover, the possible bandwidth of up to 1 GB/s that may be achieved by a Fiber-To-The-Home architecture is often not needed.

Deployment schemes which avoid physical changes to the premises of the subscribers are currently the favored approaches for broadband access. Fiber-To-The-Curb (FTTC), Fiber-To-The-distribution Point (FTTdP) and Fiber-To-The-Building or -Premise (FTTB/FTTP) deployment schemes utilize legacy copper lead in infrastructure by using sophisticated electrical modulation techniques such as VDSL or G.fast. An FTTdP infrastructure typically serves 1 to 16 subscribers per distribution point unit.

FTTC, FTTdP and FTTB/P architectures differentiate in the distance between a distribution point unit (DPU) and the subscribers as well as the number of electrical ports that are served by an optical network unit (ONU). The distribution point unit performs a conversion from optical signals propagating through the optical fibers of the optical data network to the electrical signals transferred through the wires of the electrical data network and vice versa. The electrical data network is coupled to the premises of the subscribers by respective customer premise equipment (CPE) installed in each building. The available bandwidth through the copper infrastructure of the electrical data network is mostly limited by the distance between the optical network unit and the customer premise equipment.

The distribution point units located at the distribution points can be installed underground, for example in hand- or man holes, or above ground. The above ground distribution point locations, for example at walls or street posts, are mostly at central and exposed positions. Those positions are also interesting places for installing electrical devices for different applications. With the increased security demands of the today's societies and companies there is, for example, a huge demand for camera surveillance for public spaces and private properties. Companies/organizations that operate the electrical devices, such as observation cameras or sensor systems, may install their own data network to connect one of their service centers, for example an office of a security agency or a data collecting center of a meteorological service, to the electrical devices.

Since distribution point units to couple an optical data network to an electrical data network are often installed at central locations that are usually also preferred areas for installing the above-mentioned electrical devices, it would be advantageous if distribution point units as well as the optical and/or electrical data network already existing could be used to connect the electrical devices to service/data centers of providers for offering different services.

There is a desire to provide a distribution point unit to exchange communication data between a service provider and/or subscribers via a data communication network, wherein the distribution point unit enables an electrical device to be coupled to a service provider and/or subscribers for data exchange.

SUMMARY

An embodiment of distribution point unit to exchange communication data between a service provider and subscribers, wherein the distribution point unit is expanded regarding its technical functionality to couple an electrical device to the service provider and/or to the subscribers is described.

In some embodiments, the distribution point unit comprises a first port to couple the distribution point unit to an optical data network to exchange communication data between the distribution point unit and the service provider. The distribution point unit further comprises a second port to couple the distribution point unit to an electrical data network to exchange the communication data between the subscribers and the distribution point unit. The distribution point unit comprises a third port to couple the distribution point unit to an electrical device, the third port being configured to provide control data to control the electrical device. The distribution point unit further comprises a media access controller being coupled to each of the first and second and third port. The media access controller is configured to generate the control data based on the communication data received at one of the first and second ports.

The distribution point unit may enable to couple an electrical device, for example a local Ethernet device, via the third port to the distribution point unit. The electrical device is accessible via a media access controller-bridge from the subscribers connected to the second port of the distribution point unit or from an optical line termination side in an operators central office via the first port of the distribution point unit.

According to a possible embodiment of the distribution point unit the third port is configured to provide electrical power to the electrical device. To this purpose, a power injector may be coupled to the third port to provide the electrical power to operate the electrical device connected to the third port of the distribution point unit. The third port can be configured as an Ethernet port to connect/attach an Ethernet device, such as an IP camera or an IP door/gate access control device, and to transceive communication data coded in the Ethernet coded format from/to the Ethernet device.

According to another possible embodiment, the distribution point unit may be configured as a reverse powered distribution point unit, for example a reverse powered FTTdP distribution point unit. The distribution point unit may comprise a power extractor unit being coupled to the second port to extract a DC offset voltage from a communication data signal received at the second port from at least one of the subscribers connected to the distribution point unit. The distribution point unit may comprise a power sourcing unit that converts a level of the DC offset voltage received from the power extractor unit and used for the reverse powering to the level of a supply voltage/electrical power to operate the main components of the distribution point unit, for example the media access controller. The power sourcing unit may be further configured to convert the level of the DC offset voltage received from the power extractor unit to the level of a supply power/electrical power to operate the electrical device.

According to another possible embodiment of the distribution point unit, the second port may comprise a plurality of connectors, wherein each of the subscribers is connected to a respective one of the connectors of the second port. The power extractor unit may comprise a plurality of power extractors, wherein each of the power extractors is connected to a respective one of the connectors of the second port. Each of the power extractors may be configured to provide the respective DC offset voltage extracted from the respective communication data signal received at the respective connector of the second port from a respective subscriber to a power sourcing unit of the distribution point unit. The power sourcing unit is configured to convert a level of the received DC offset voltages to a level of the electrical supply power that is needed to operate the electrical device.

The capability of a reverse powered distribution point unit, for example an FTTdp distribution point unit, is expanded to connect an electrical device to the distribution point unit and to supply the electrical device with electrical power. By adding additional components to the DPU printed circuit board and a third port, for example a field hardened RJ45 connector, to the DPU enclosure, the DPU gets the capability to host and power an Ethernet port that can be used to attach an electrical device, for instance an IP camera or an IP door/gate access control device. In particular, Ethernet-cameras, that can be powered via an Ethernet cable using the Power Over Ethernet (POE) standard are well-suited to be connected to the distribution point unit, since they can be easily managed and do not need local power sources. Depending on the configuration of the DPU, the third port, for example the Ethernet port, can be accessed locally from the subscriber premises and/or from a service provider.

The distribution point unit adds additional capabilities to an FTTdP infrastructure that allows an operator to offer additional services, for example in the area of security and surveillance. The FTTdP operator already owns the critical infrastructure assets that a provider of a sole service, for example a surveillance provider, would have to build or acquire. That relates to strategic location access for installing electrical devices, electrical powering and an Ethernet data backbone.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying figures, in which.

DETAILED DESCRIPTION

Figure 1:
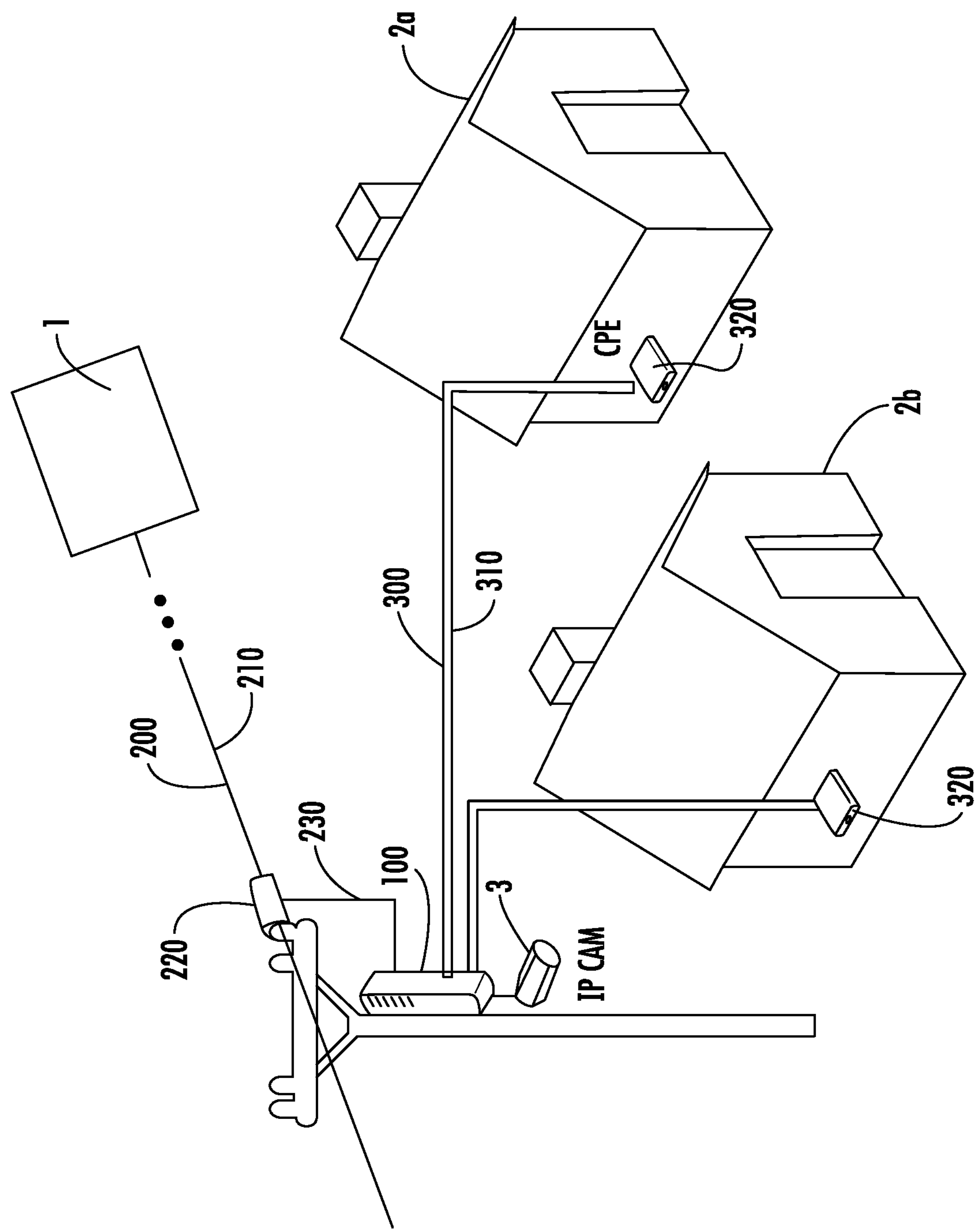
FIG. 1 shows a fiber to the distribution point (FTTdP) aerial deployment scheme with an electrical device connected to a distribution point unit.

FIG. 1 shows a fiber to the distribution point (FTTdP) aerial deployment scheme comprising a distribution point unit 100 to exchange communication data between a service provider 1 and subscribers 2*a*, 2*b*. The distribution point unit 100 is used to couple an optical data network 200 to an electrical data network 300. The architecture allows to couple the service provider 1 via the optical data network 200, the distribution point unit 100 and the electrical data network 300 to the subscribers 2*a*, 2*b*.

In the aerial deployment scheme shown in FIG. 1, the distribution point unit 100 may be mounted to a post carrying a multi-fiber optical distribution cable 210 of the optical data network 200. Communication data transferred via the multi-fiber optical distribution cable 210 from the service provider 1 may be coupled out from the cable 210 at an optical breakout device 220 to be transferred to the distribution point unit 100 via an optical cable 230, for example a single fiber optical drop cable. The communication data may also be transferred in the other direction, i.e. from the distribution point unit 100 via the optical cable 230 and the distribution cable 210 to the service provider 1. The distribution point unit 100 is configured to convert the optical data to electrical data and vice versa.

The electrical data network 300 may comprise copper drop cables 310 that connect the distribution point unit 100 to a respective customer premise equipment 320 of the premises 2*a* and 2*b*. The distribution point unit 100 is configured to receive electrical communication data via the electrical data network 300 from the premises 2*a*, 2*b* and to transmit the electrical communication data via the electrical data network 300 to the premises 2*a*, 2*b*.

The distribution point unit 100 comprises a first external port to couple the distribution point unit 100 to the optical data network 200 and a second port to couple the distribution point unit 100 to the electrical data network 300. In addition to the first and second ports, the distribution point unit 100 comprises a third port to couple the distribution point unit 100 to an electrical device 3. The electrical device 3 may be configured, for example as a camera device, a sensor device, an illumination device or a WiFi access device. The connection of other electrical devices having other functionalities is also possible. According to a possible embodiment, the electrical device may be configured as an Ethernet device transmitting/receiving communication data having an Ethernet coded format, for example being coded by Ethernet frames. In the exemplified illustration of the FTTdP architecture of FIG. 1, the electrical device 3 is configured as an IP camera.

FIGS. 2A, 2B, 2C and 2D show a respective possible implementation of different embodiments of the distribution point unit 100 comprising an external port to connect an electrical device to the distribution point unit.

According to the embodiments of the distribution point unit 100 shown in FIGS. 2A to 2D, the distribution point unit 100 comprises a first port 10 to couple the distribution point unit 100 to the optical data network 200 to exchange communication data between the distribution point unit 100 and the service provider 1. The first port 10 may be configured to receive the communication data in an optically coded format from the service provider 1 and/or to transmit the communication data in the optically coded format to the service provider 1. The first port 10 may comprise a connector 11 being configured to connect the distribution point unit 100 to the optical data network 200. The first connector 11 is configured to receive the communication data in an optically coded format from the service provider 1 and to transmit the communication data in the optically coded format to the service provider 1.

The distribution point unit 100 further comprises a second port 20 to couple the distribution point unit 100 to the electrical data network 300 to exchange the communication data between the subscribers 2*a*, . . . , 2*n* and the distribution point unit 100. In particular, the second port 20 is configured to transmit the communication data in an electrically coded format to one of the subscribers and/or to receive the communication data in the electrically coded format from one of the subscribers 2*a*, . . . , 2*n*. The second port 20 may comprise a plurality of connectors 20*a*, 20*b*, . . . , 20*n*, wherein each of the connectors 20*a*, 20*b*, . . . , 20*n* is connected to a respective one of the subscribers 2*a*, 2*b*, . . . , 2*n* via the electrical data network 300. The connectors 20*a*, 20*b*, . . . , 20*n* are configured to respectively receive the communication data in an electrically coded format from a respective one of the subscribers 20*a*, 20*b*, . . . , 20*n* and to transmit the communication data in an electrically coded format to a respective one of the subscribers 20*a*, 20*b*, . . . , 20*n*.

According to the embodiments of the distribution point unit shown in FIGS. 2A to 2D the first port 10 is coupled to an optical interface 110 comprising at least one optical transceiver as well as all necessary control and management electronics, such as laser drivers, transimpedance amplifiers, etc. The optical interface 110 terminates the optical distribution network 200 at the subscriber side.

The distribution point unit 100 further comprises a media access controller 120 to perform channel access control tasks. The media access controller 120 distributes communication data received from the optical data network 200 to one of the subscribers 2*a*, . . . , 2*n* and vice versa. The media access controller 120 comprises output ports O120 that are coupled via a media-independent interface to a transceiver unit 140. The transceiver unit 140 comprises a plurality of transceivers 140*a*, 140*b*, . . . , 140*n* Each of the transceivers may comprise a digital frontend device 141, an analogue frontend device 142 and a laser driver 143. The digital frontend device 141, the analogue frontend device 142 and the laser driver 143 may be either monolithically integrated or individual chips. Each of the transceivers 140*a*, 140*b*, . . . , 140*n* is connected to a communication data line TC1, TC2, . . . , TCn for transferring the communication data in the electrically coded format to the second port 20. Each of the communication data lines TC1, TC2, . . . , TCn is connected to a respective one of the electrical drop cables 320.

The transceiver unit 140 may be configured as a Digital Subscriber Line transceiver (xDSL TRX) that provides the data-connection to the buildings of the subscribers 2*a*, 2*b*, . . . , 2*n* using copper based lines TC1, TC2, . . . , TCn being embodied as twisted-pair or coaxial lines. The transceivers 140*a*, 140*b*, . . . , 140*n* may be configured as xDSL-transceivers. The data lines TC1, TC2, . . . , TCn may be respectively configured as a single line pair (xDSL), for example a copper line, for transferring the communication data in the xDSL data format.

The distribution point unit 100 comprises a third port 30 to couple the distribution point unit 100 to an electrical device 3. The third port 30 is configured to provide control data to control the electrical device 3. The media access controller 120 is coupled to the third port 30. The media access controller 120 is configured to generate the control data to control the electrical device 3 based on the communication data received at one of the first and second ports 10 and 20 from the service provider 1 or one of the subscribers 2*a*, 2*b*, . . . , 2*n*.

According to the embodiments of the distribution point unit 100 shown in FIGS. 2A to 2D, the electrical device 3 may be configured as one of a camera device and a sensor device, for example a humidity or temperature sensor device, and an illumination device and a WiFi access device. According to a further embodiment, the electrical device 3 may be configured as an Ethernet device that is configured to receive and transmit data in an Ethernet coded format via the third port 30. In this case the third port 30 is configured as an Ethernet port.

According to the embodiments of the distribution point unit shown in FIGS. 2A to 2D, the media access controller 120 is configured to provide the communication data received from the electrical device 3 at the at least one third port 30 to at least one of the first port 10 and the second port 20. In the case, if the third port 30 is configured as an Ethernet port, the media access controller 120 is configured to perform Ethernet frames addressing so that communication data received from the electrical device 3 at the third port 30 in the Ethernet coded format is distributed by the media access controller 120 to at least one of the first port 10 and the second port 20. Thus, the communication data received from the electrical device 3 may be transferred via the optical data network 200 to the service provider 1 or via the electrical data network 300 to one the subscribers 2*a*, 2*b*, . . . , 2*n*. The media access controller 120 is further configured to transfer the control data to control the electrical device 3 to the third port 30.

According to the embodiments of the distribution point unit 100 shown in FIGS. 2A to 2D, the distribution point unit 100 may comprise an Ethernet transceiver 180 that is coupled between the media access controller 120 and the third port 30. The Ethernet transceiver 180 is configured to receive the communication data being coded in the Ethernet data format from the third port 30, respectively the electrical device 3 via a communication data line EC. The Ethernet transceiver 180 is configured to change the Ethernet data format of the received communication data in a media access controller compatible data format. The Ethernet transceiver 180 is further configured to transmit the communication data in the media access controller compatible data format to the media access controller 120 for further data processing.

The Ethernet transceiver 180 is configured to receive the communication data being coded in the media access controller compatible data format from the media access controller 120 and to change the media access controller compatible data format of the communication data in the Ethernet data format. The Ethernet transceiver 180 is configured to transmit the communication data in the Ethernet data format via the communication data line EC to the third port 30, respectively the electrical device 3. The data line EC being arranged between the third port 30 and the Ethernet transceiver 180 may comprise two line pairs that may be arranged in a twisted configuration. The Ethernet transceiver 180 may be configured as an Ethernet PHY-chip for Ethernet over twisted pair transmissions.

Figure 2A:
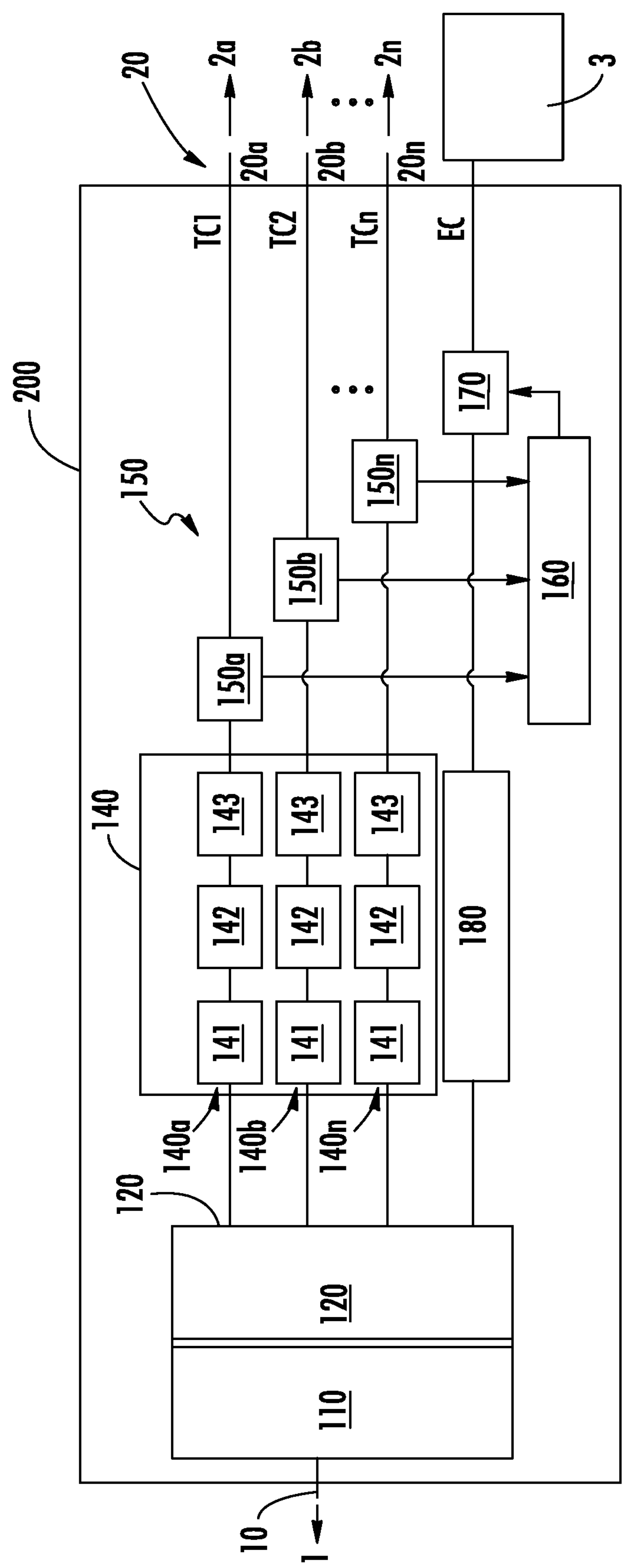
FIG. 2A shows a first embodiment of an implementation of a distribution point unit with a powered port to connect an electrical device to the distribution point unit.
Figure 2B:
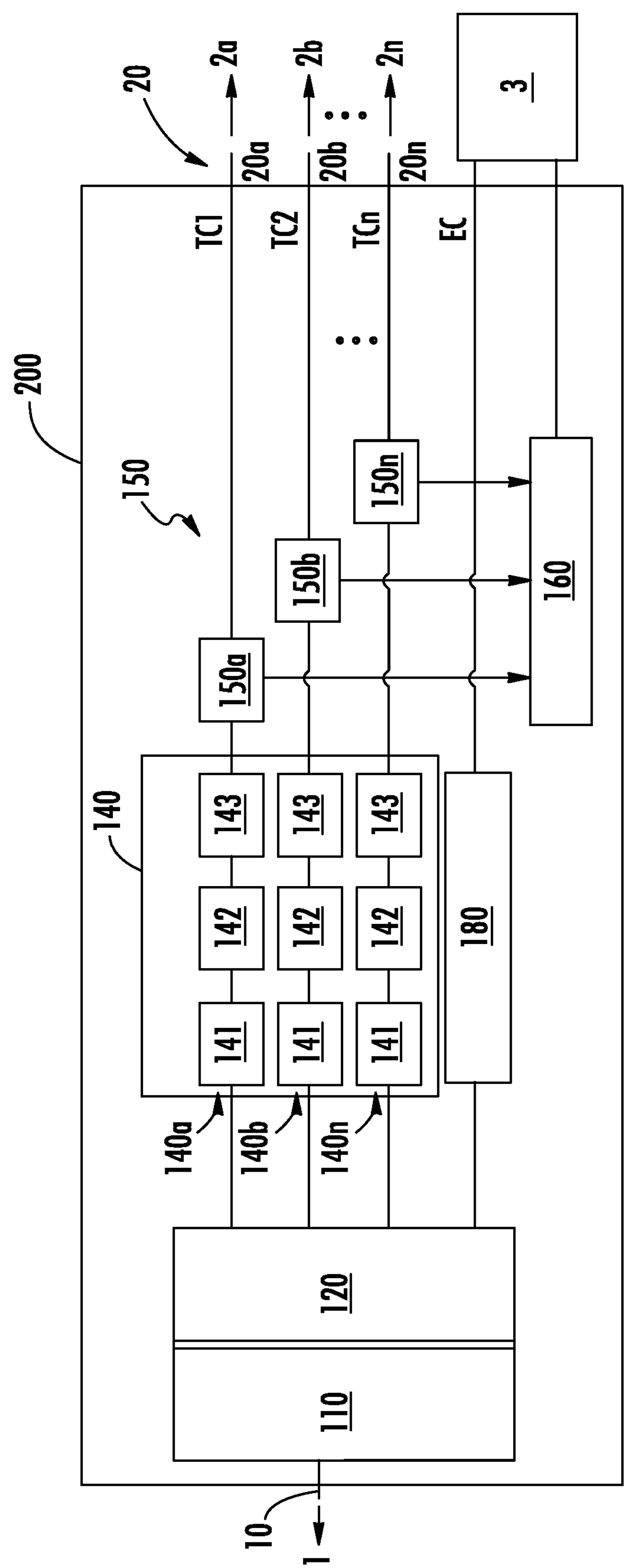
FIG. 2B shows a second embodiment of an implementation of a distribution point unit with a powered port to connect an electrical device to the distribution point unit.

As illustrated in the embodiments of the distribution point unit shown in FIGS. 2A and 2B, the Ethernet transceiver 180 is directly connected to the media access controller 120. The media access controller 120 may also be directly connected to each of the transceivers 140*a*, 140*b*, . . . , 140*n* of the transceiver unit 140. The media access controller 120 is configured to transmit the communication data received from the electrical device 3 to the first port 10 or to one of the transceivers 140*a*, 140*b*, . . . , 140*n* of the transceiver unit 140 for being passed to one of the subscribers 2*a*, 2*b*, . . . , 2*n*.

Figure 2C:
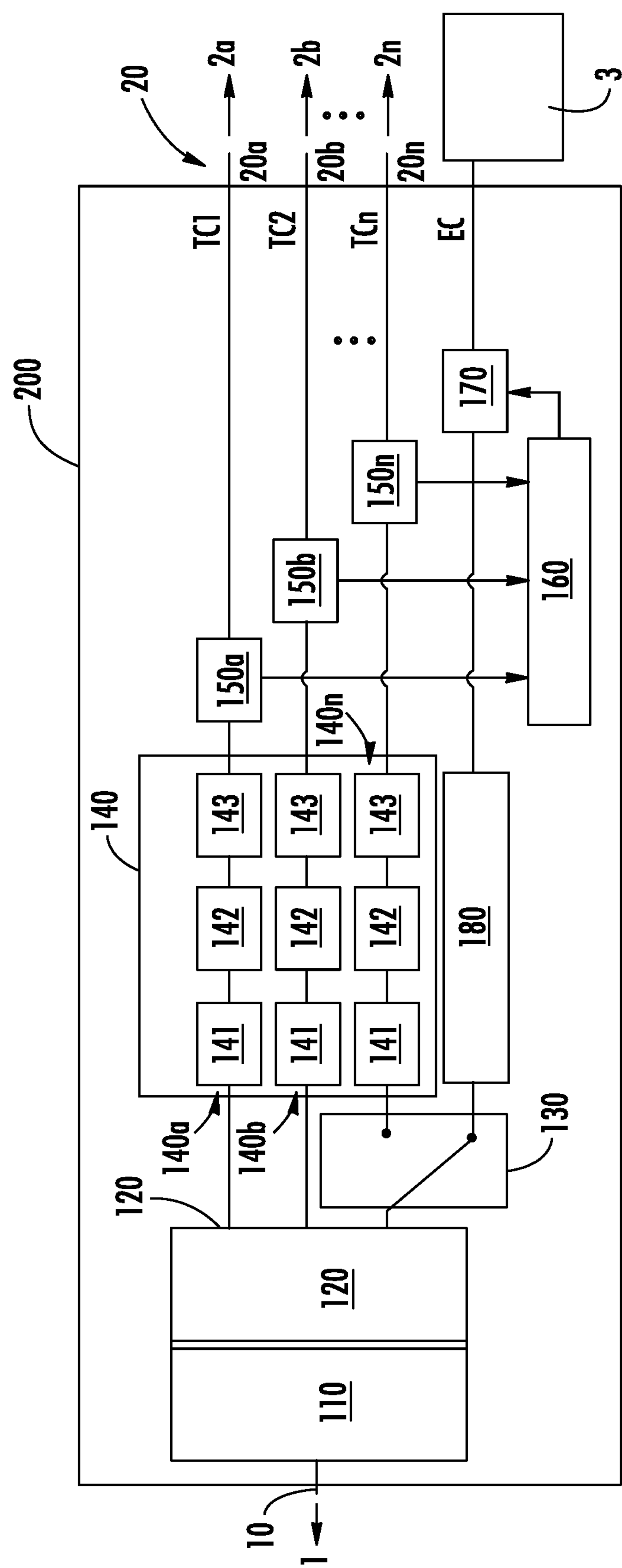
FIG. 2C shows a third embodiment of an implementation of a distribution point unit with a powered port to connect an electrical device to the distribution point unit.
Figure 2D:
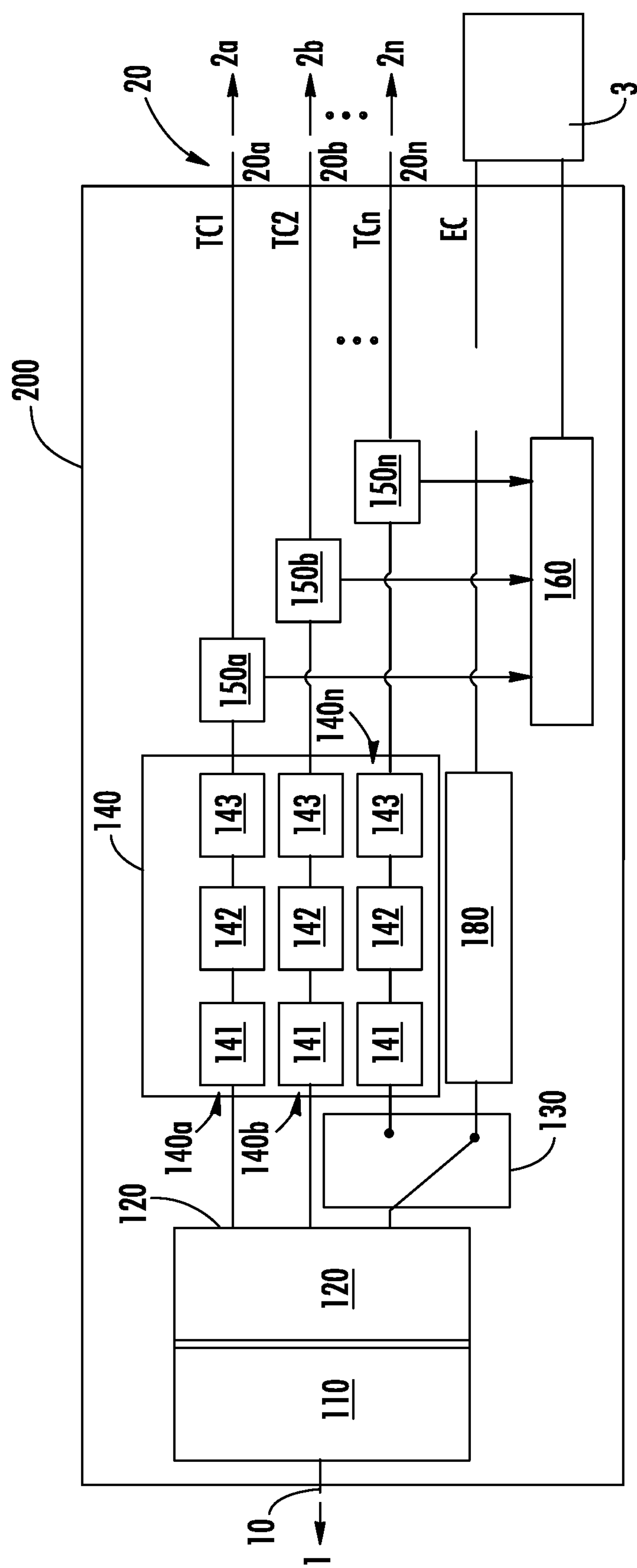
FIG. 2D shows a fourth embodiment of an implementation of a distribution point unit with a powered port to connect an electrical device to the distribution point unit.

FIGS. 2C and 2D show another embodiment of the distribution point unit 100, wherein the distribution point unit comprises a switching unit 130 being arranged between the media access controller 120 and the Ethernet transceiver 180. The switching unit 130 is configured to selectively couple the media access controller 120 to one of the second port 20 and the third port 30. The configuration of the distribution point unit shown in FIGS. 2C and 2D enables to provide the media access controller 120 having a number of output terminals O120 that is equal to the number of transceivers of the transceiver unit 140, respectively the number of connectors 20*a*, 20*b*, . . . , 20*n* of the second port 20. In contrast to the embodiments of the distribution point unit 100 shown in FIGS. 2C and 2D, the media access controller 120 of the embodiments of the distribution point unit 100 shown in FIGS. 2A and 2B has a higher number of output terminals O120 than the number of transceivers 140*a*, 140*b*, . . . , 140*n* being included in the transceiver unit 140.

According to a first possible switching state of the switching unit 130, the media access controller 120 is connected by the switching unit 130 to the Ethernet transceiver 180. The communication data received from the electrical device 3 may be distributed from the media access controller 120 to the optical data network 200 and/or to one of the transceivers, for example the transceivers 140*a* and 140*b*, that are directly connected to the output terminals O120 of the media access controller 120. The media access controller 120 may transfer the communication data received from the electrical device 3 at the third port 30 to one of the connector 11 of the first port 10 and the connectors 20*a* and 20*b* of the second port 20.

If the switching unit 130 is operated in a second switching state, in which the media access controller 120 is disconnected from the third port 30 and is connected to the transceiver 140*n* of the transceiver unit 140, communication data may be exchanged between the service provider 1 and the subscribers 2*a*, 2*b*, . . . , 2*n*, but not between the service provider/the subscribers and the electrical device 3.

According to the embodiments of the distribution point unit 100 shown in FIGS. 2C and 2D, the switching unit 130 may be configured as a high speed passive switch for switching the connection of one of the output terminals O120 of the media access controller 120 either to one of the transceiver channels TC1, TC2, . . . , TCn or to the Ethernet channel EC. The switching unit 130 needs to support the data rates of the media-independent interface that is used to connect the media access controller 120 to the physical transceivers 140*a*, 140*b*, . . . , 140*n* of the transceiver unit 140 and the Ethernet transceiver 180. A passive switch such as the Maxim MAX4888 could be used for the Gigabit Ethernet capable SGMII-(media independent) interface.

According to the embodiments shown in FIGS. 2A to 2D, the distribution point unit 200 is configured to be powered reversely by the customers premise equipment 320. The distribution point unit 100 comprises a power extractor unit 150 to extract a DC offset voltage from a data communication signal received at the second port 20. According to the possible embodiments of the distribution point unit 100 shown in FIGS. 2A to 2D, the power extractor unit 150 comprises a plurality of power extractors 150*a*, 150*b*, . . . , 150*n*. Each power extractor is coupled to one of the communication data lines TC1, TC2, . . . , TCn, respectively one of the electrical drop cables 320.

The power extractors 150*a*, 150*b*, . . . , 150*n* are configured to extract the respective DC offset voltage from a respective one of the communication data signals being transferred from a respective one of the subscribers 2*a*, 2*b*, . . . , 2*n* to a respective one of the connectors 20*a*, 20*b*, . . . , 20*n* and thus to a respective one of the communication data lines TC1, TC2, . . . , TCn. The distribution point unit 100 comprises a power sourcing unit 160 that is configured to convert the DC offset voltage levels received from the power extractors 150*a*, 150*b*, . . . , 150*n* for the reverse powering to the levels required to operate the components of the distribution point unit 100, for example the media access controller 120.

According to a possible embodiment of the distribution point unit 100, the third port 30 is configured to provide electrical power to the electrical device 3. According to the embodiments of the distribution point unit 100 shown in FIGS. 2A to 2D, the power extractor unit 150 is configured to extract a DC offset voltage from at least one of the communication data signals received at the second port 20 from at least one of the subscribers 2*a*, 2*b*, . . . , 2*n*. The power extractor unit 150 applies the extracted DC offset voltages to the power sourcing unit 160 of the distribution point unit 100. The power sourcing unit 160 is configured to receive the DC offset voltages from the power extractor unit 150 and to convert a level of the received DC offset voltage to a level of the electrical supply power that is required to operate the electrical device 3.

According to the embodiments of the distribution point unit 100 shown in FIGS. 2A to 2D, the power extractors 150*a*, 150*b*, . . . , 150*n* of the power extractor unit 150 are coupled to a respective one of the communication data lines TC1, TC2, . . . , TCn, respectively the connectors 20*a*, 20*b*, . . . , 20*n* of the second port 20. The power extractors 150*a*, 150*b*, . . . , 150*n* are configured to extract a respective DC offset voltage from the communication data signals received at the connectors 20*a*, 20*b*, . . . , 20*n* and to provide the respective DC offset voltages to the power sourcing unit 160.

In the case of multiple subscribers being coupled to the distribution point unit 100, the power sourcing unit 160 combines the different DC voltage levels extracted by the power extractors 150*a*, 150*b*, . . . , 150*n* to generate the level of the electrical supply power required to operate the electrical device 3. The power sourcing unit 160 is configured to receive the respective DC offset voltage from each of the power extractors 150*a*, 150*b*, . . . , 150*n* and to convert the received levels of the DC offset voltages to the level of the electrical supply power required to operate the electrical device 3.

The distribution point unit 100 may comprise a power injector 170 to apply the electrical power, for example a DC offset voltage, to the communication data line EC. The power sourcing unit 160 is coupled to power injector 170 to provide the electrical supply power to the power injector 170. As shown in the embodiments of the distribution point unit 100 of FIGS. 2A and 2C, the power injector 170 is coupled to the communication data line EC, respectively the third port 30 to supply the electrical power at the third port 30 to operate the electrical device 3. In the case that the third port 30 is configured at an Ethernet port, the power injector 170 may be configured to provide Power Over Ethernet (POE) to the third port 30.

The electrical device 3, for example a local Ethernet device 3, can be powered using the Power Over Ethernet injector 170 that is connected to the power sourcing unit 160. The distribution point unit 100 itself is powered reversely by the customers premise equipment 320. The relevant standard according to ETSI Reverse Powering Specification TS 101 548 v1.1.1 (European Requirements for Reverse Powering of Remote Access Equipment) limits the maximum power that may be applied to the distribution point unit to 21 W. The maximum power that is actually usable at the distribution point unit depends on the number of subscribers attached to the distribution point unit and the line length between the distribution point unit and the subscribers premises. For a typical FTTdP scenario with 200 m of copper lines with 0.5 mm diameter, a distribution point unit can extract 12 W per subscriber. The distribution point unit itself requires about 5 to 10 W per connector of the second port 20, depending on how many subscribers are attached and what transmission technologies are used. Therefore, the connection of a powered electrical device, such as an IP camera, with a power consumption of 3 to 5 W is feasible.

FIGS. 2A and 2C show an embodiment of the distribution point unit 100, wherein the third port 30 comprises only one connector 31 that is configured to provide and receive the communication data and to provide the power supply voltage for operating the electrical device 3. This single connector 31 of the third port 30 may be configured as an Ethernet connector that is configured to provide Power Over Ethernet (POE).

FIG. 2B and FIG. 2D show another embodiment of the distribution point unit 100, wherein the third port 30 comprises a first connector 31 and a second connector 32. The first connector 31 is configured to provide and receive the communication data. The second connector 32 is configured to provide the power supply voltage from the power sourcing unit 160 for operating the electrical device 3.

The invention claimed is:

1. A distribution point unit to exchange communication data between a service provider and subscribers, comprising:

a first port for coupling the distribution point unit to an optical data network and for exchanging communication data between the distribution point unit and the service provider;

a second port for coupling the distribution point unit to an electrical data network and for exchanging the communication data between the subscribers and the distribution point unit;

a third port for coupling the distribution point unit to an electrical device, the third port configured to provide control data to control the electrical device;

a media access controller coupled to each of the first port, the second port, and the third port, wherein the media access controller is configured to generate the control data based on the communication data received at one of the first and second ports;

a power injector to apply electrical power to the third port;

a power extractor unit being coupled to the second port to extract a DC offset voltage from a communication data signal received at the second port; and a power sourcing unit to receive the DC offset voltage from the power extractor unit and convert a level of the received DC offset voltage to a level of the electrical supply power required to operate the electrical device.

2. The distribution point unit of claim 1, wherein the third port is configured to provide electrical power to the electrical device.

3. The distribution point unit of claim 1, wherein the electrical device is one or more of a camera, a sensor, an illumination device, and a WiFi access device.

4. The distribution point unit of claim 1, wherein the electrical device is configured to receive and transmit data in an Ethernet coded format.

5. The distribution point unit of claim 1, wherein the power injector is configured to provide Power Over Ethernet.

6. The distribution point unit of claim 1, wherein the media access controller is configured to provide the communication data received from the electrical device at the third port to one of the first and the second ports.

7. The distribution point unit of claim 1, wherein the third port comprises one connector being configured to provide and receive the communication data and to provide a power supply for operating the electrical device.

8. The distribution point unit of claim 1, wherein the at least one third port comprises a first connector being configured to provide and receive the communication data and a second connector to provide electrical power for operating the electrical device.

9. The distribution point unit of claim 1, wherein:

the first port comprises a first connector to receive the communication data in an optically coded format and to transmit the communication data in the optically coded format;

the second port comprises a first connector and at least a second connector to respectively transmit the communication data in an electrically coded format and to respectively receive the communication data in the electrically coded format; and the media access controller is configured to transfer the communication data received at the third port to one of the first connector of the first port and to one of the first connector and the at least one second connector of the second port.

10. A distribution point unit to exchange communication data between a service provider and subscribers comprising:

a first port for coupling the distribution point unit to an optical data network and for exchanging communication data between the distribution point unit and the service provider;

a second port for coupling the distribution point unit to an electrical data network and for exchanging the communication data between the subscribers and the distribution point unit;

a third port for coupling the distribution point unit to an electrical device, the third port configured to provide control data to control the electrical device;

a media access controller coupled to each of the first port, the second port, and the third port, wherein the media access controller is configured to generate the control data based on the communication data received at one of the first and second ports;

a switching unit being arranged between the media access controller and an Ethernet transceiver, wherein the switching unit is configured to selectively couple the media access controller to one of the second and third port; and an Ethernet transceiver being coupled between the media access controller and the third port;

wherein the Ethernet transceiver is configured to receive the communication data being coded in an Ethernet data format from the at least one third port and to change the Ethernet data format of the communication data in a media access controller compatible data format being adapted for data processing by the media access controller and to transmit the communication data in the media access controller compatible data format to the media access controller; and wherein the Ethernet transceiver is configured to receive the communication data being coded in the media access controller compatible data format from the media access controller and to change the media access compatible data format of the communication data in the Ethernet data format and to transmit the communication data in the Ethernet data format to the third port.

11. A distribution point unit to exchange communication data between a service provider and subscribers, comprising:

a first port for coupling the distribution point unit to an optical data network and for exchanging communication data between the distribution point unit and the service provider;

a second port for coupling the distribution point unit to an electrical data network and for exchanging the communication data between the subscribers and the distribution point unit;

a third port for coupling the distribution point unit to an electrical device, the third port configured to provide control data to control the electrical device; and a media access controller coupled to each of the first port, the second port, and the third port;

wherein the media access controller is configured to generate the control data based on the communication data received at one of the first and second ports, and wherein a power extractor unit comprises a first power extractor being coupled to a first connector of the second port and being configured to extract a first DC offset voltage from the communication data signal received at the first connector of the second port and to provide the first DC offset voltage to a power sourcing unit;

the power extractor unit comprises at least a second power extractor being coupled to at least one second connector of the second port and being configured to extract at least one second DC offset voltage from the communication data signal received at the at least one second connector of the second port and to provide the at least one second DC offset voltage to the power sourcing unit; and the power sourcing unit is configured to receive the first DC offset voltage and the at least one second DC offset and to convert a respective level of the first and the at least one second DC offset voltage to the level of the electrical supply power required to operate the electrical device.

* * * * *

UNITED STATES PATENT AND TRADEMARK OFFICE

CERTIFICATE OF CORRECTION

PATENT NO. : 10,819,456 B2
APPLICATION NO. : 16/283280
DATED : October 27, 2020
INVENTOR(S) : Martin Spreemann It is certified that error appears in the above-identified patent and that said Letters Patent is hereby corrected as shown below:

In the Specification

In Column 1, Line 10 (approx.), delete "16186623.1," and insert -- 16188623.1, --, therefor.

Signed and Sealed this
Second Day of August, 2022

Katherine Kelly Vidal

Katherine Kelly Vidal
*Director of the United States Patent and Trademark Office*